(12) United States Patent
Angelova et al.

(10) Patent No.: US 8,879,855 B2
(45) Date of Patent: Nov. 4, 2014

(54) IMAGE SEGMENTATION FOR LARGE-SCALE FINE-GRAINED RECOGNITION

(71) Applicant: NEC Laboratories America, Inc., Princeton, NJ (US)

(72) Inventors: Anelia Angelova, Sunnyvale, CA (US); Shenghuo Zhu, Santa Clara, CA (US); Yuanqing Lin, Sunnyvale, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 90 days.

(21) Appl. No.: 13/858,044

(22) Filed: Apr. 6, 2013

(65) Prior Publication Data

US 2014/0050391 A1    Feb. 20, 2014

Related U.S. Application Data

(60) Provisional application No. 61/684,250, filed on Aug. 17, 2012.

(51) Int. Cl.
*G06K 9/62*     (2006.01)
*G06K 9/00*     (2006.01)
*G06T 7/00*     (2006.01)

(52) U.S. Cl.
CPC .......... *G06K 9/6267* (2013.01); *G06K 9/00624* (2013.01); *G06T 7/0079* (2013.01)
USPC ............ 382/224; 382/225; 382/226; 382/228

(58) Field of Classification Search
USPC ......... 382/159, 160, 165, 169, 170, 181, 224, 382/225, 226, 227, 228; 700/47, 50; 706/15, 19, 20, 22, 41
See application file for complete search history.

(56) References Cited

U.S. PATENT DOCUMENTS

| 8,442,319 B2 * | 5/2013 | Sarkar et al. .................. 382/180 |
| 2007/0014435 A1 * | 1/2007 | Mirowski et al. ............. 382/109 |
| 2011/0007366 A1 * | 1/2011 | Sarkar et al. .................. 358/462 |

* cited by examiner

*Primary Examiner* — Brian Le
(74) *Attorney, Agent, or Firm* — Joseph Kolodka

(57) ABSTRACT

A method for fine-grained image classification on an image includes automatically segmenting one or more objects of interest prior to classification; and combining segmented and original image features before performing final classification.

18 Claims, 2 Drawing Sheets

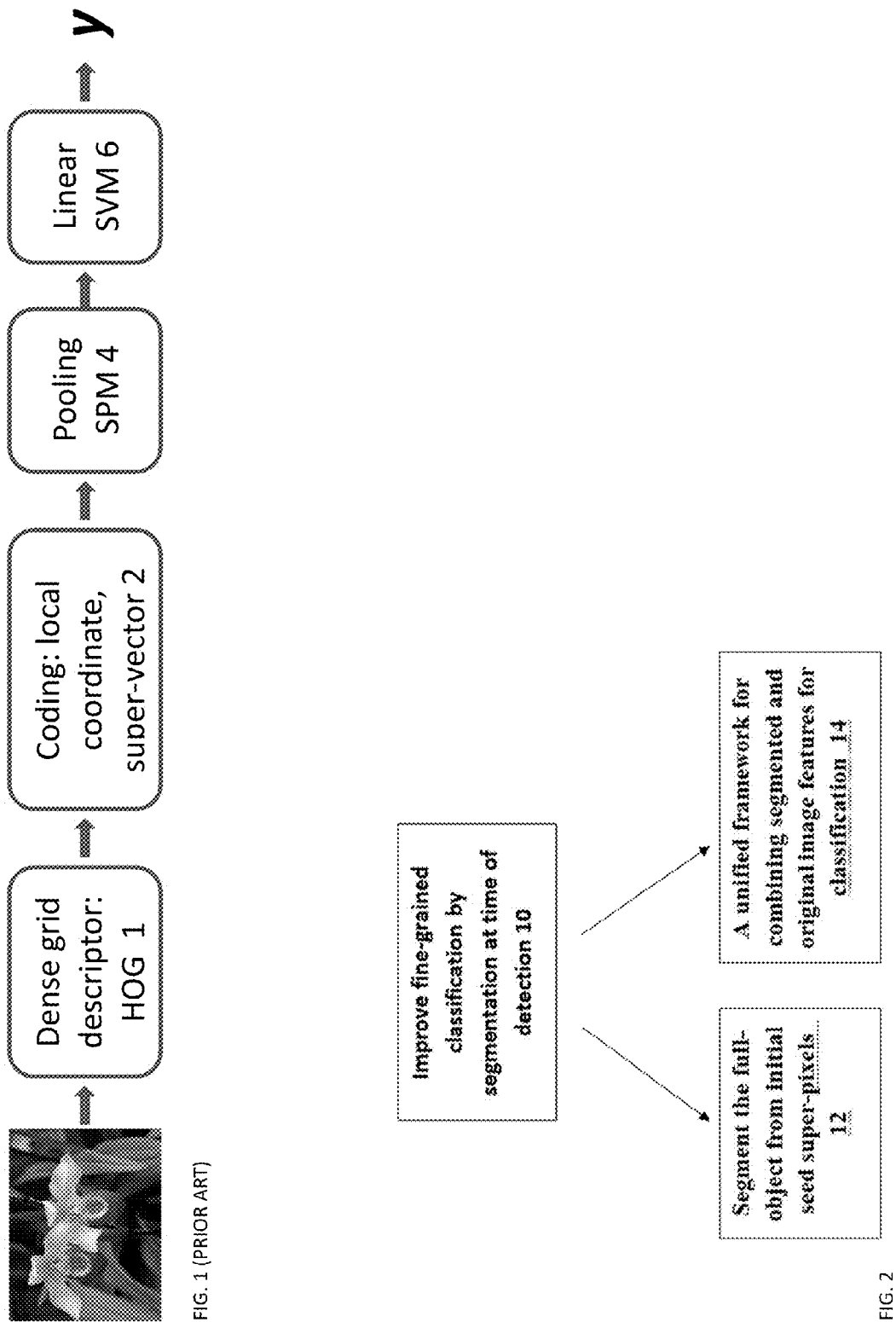

IMAGE SEGMENTATION FOR LARGE-SCALE FINE-GRAINED RECOGNITION

This application is a non-provisional of and claims priority to Provisional Application Ser. No. 61684250 filed Aug. 17, 2012, the content of which is incorporated by reference.

BACKGROUND

This invention relates to image segmentation for large-scale fine-grained recognition.

Certain tasks require recognition of detailed objects. For example, the task of automatic recognition of different species of flowers can be classified as subcategory recognition, or fine-grained classification, in which the base-level category is 'flower' and the classes to be recognized are different types of flowers. In the subcategory recognition setting, the main challenge lies in the very fine differences between possibly similar objects that belong to different classes. Only very well trained experts are able to discriminate between all of the categories properly. Naturally, an automatic recognition system in such a setting will provide much value to non-experts.

One of the main goals for any such system is improving the recognition performance. As mentioned, the main challenges in subcategory classification are the fine differences between classes. Other challenges, specific to an automatic recognition system, are also present, for example, scale variations, intra-class variability, inter-class similarities, image blur, among others, as experienced by a conventional system such as that of FIG. 1. In FIG. 1 the system can segment potential object that belongs to the super-category. The system can also utilize the segmented image in a combined pipeline for better performance. The process applies a dense grid descriptor Histogram of Oriented Gradients (HOG) (1). Next, a local coordinate super-vector 2 is coded. An Spatial Pyramid Matching (SPM) pooling is done (4), and a linear support vector machine (SVM) is applied (6).

One complication for images of flowers is that flower photographs are often taken in natural settings with rich and challenging backgrounds. Although the background can generally provide useful context, it can sometimes serve as distractor to a classification technique. For example, background features can become prominent and be extracted as possibly good discriminators, or some background features may be matched across different categories and thus make it harder to discriminate among them. This can cause deteriorated performance of the classification technique.

SUMMARY

In one aspect, a method for fine-grained image classification on an image includes automatically segmenting one or more objects of interest prior to classification; and combining segmented and original image features before performing final classification.

Implementations of the above aspect can include one or more of the following. The process includes obtaining initial regions with super-pixel segmentation. Initial regions can be classified by a region model trained on the super-class as the background, and preferably uses Felzenszwalb and Huttenlocher segmentation. The process includes learning a model to detect one or more regions of object(s) in the image. The segmentation uses Laplacian propagation applied to a foreground region and a background region. The process includes reusing previously computed features in a pipeline from the image. High confidence regions for background and the object are extracted. The process can include determining an affinity matrix W, using a feature representations $f_i$ of each pixel:

$$W_{ij} = \exp\left(-\frac{|f_i - f_j|^2}{2\sigma^2}\right);$$

minimizing a cost function C(X) with respect to all pixel labels X:

$$C(X) = \frac{1}{2}\sum_{i,j=1}^{N} W_{ij}\left|\frac{X_i}{\sqrt{D_{ii}}} - \frac{X_j}{\sqrt{D_{jj}}}\right|^2 + \sum_{i=1}^{N} \frac{\lambda}{2}|X_i - Y_i|^2$$

where $D_{ii} = \sum_{j=1}^{N} W_{ij}$, and $Y_i$ are the desired labels for pixels; and solving an optimal solution for X as a system of linear equations:

$$((1+\lambda)I - S)X = \lambda Y$$

$$X = \lambda((1+\lambda)I - S)^{-1}Y.$$

In another aspect, a method includes identifying potential object regions at the time of detection; applying a Laplacian-based segmentation, which is guided by these initially detected regions.

Implementations of the above aspect can include one or more of the following. The process first segments possible object (or objects) that belongs to a top level category. For fine-grained classification, the general top-level category, although very broad, is known so here the process learns a model that can detect regions of possible object in an image. Super-pixel segmentation (Felzenszwalb and Huttenlocher) is used for obtaining initial regions. The initial regions are classified by a region model which is trained on the super-class vs the background. High confidence regions are extracted for both background and object. A Laplacian segmentation is used to extract the full segmented region from initial uncertain (and not always initialized) regions. Next the process utilizes the image with the segmented object (segmented image) in the recognition pipeline to improve the recognition performance. The process combines both the original image and the segmented image before doing the final classification.

Advantages of the preferred embodiment may include one or more of the following. Recognizing parts of the potential object helps the segmentation and makes it more robust to variabilities in both the background and the object appearances. Segmenting the object of interest at test time is beneficial for the subsequent recognition. The use of the Laplacian propagation as the optimization technique allows for fast convergence and contributes to significant decrease of the overall run-time. This segmentation is 5-6 times faster than previously known segmentation algorithms in similar scenarios. Furthermore, the method is simpler and is applicable to a variety of datasets,

BRIEF DESCRIPTION OF THE DRAWINGS

FIG. 1 shows a conventional process for image classification.

FIG. 2, a framework for combining both input and segmented image

DESCRIPTION

Figure 3:
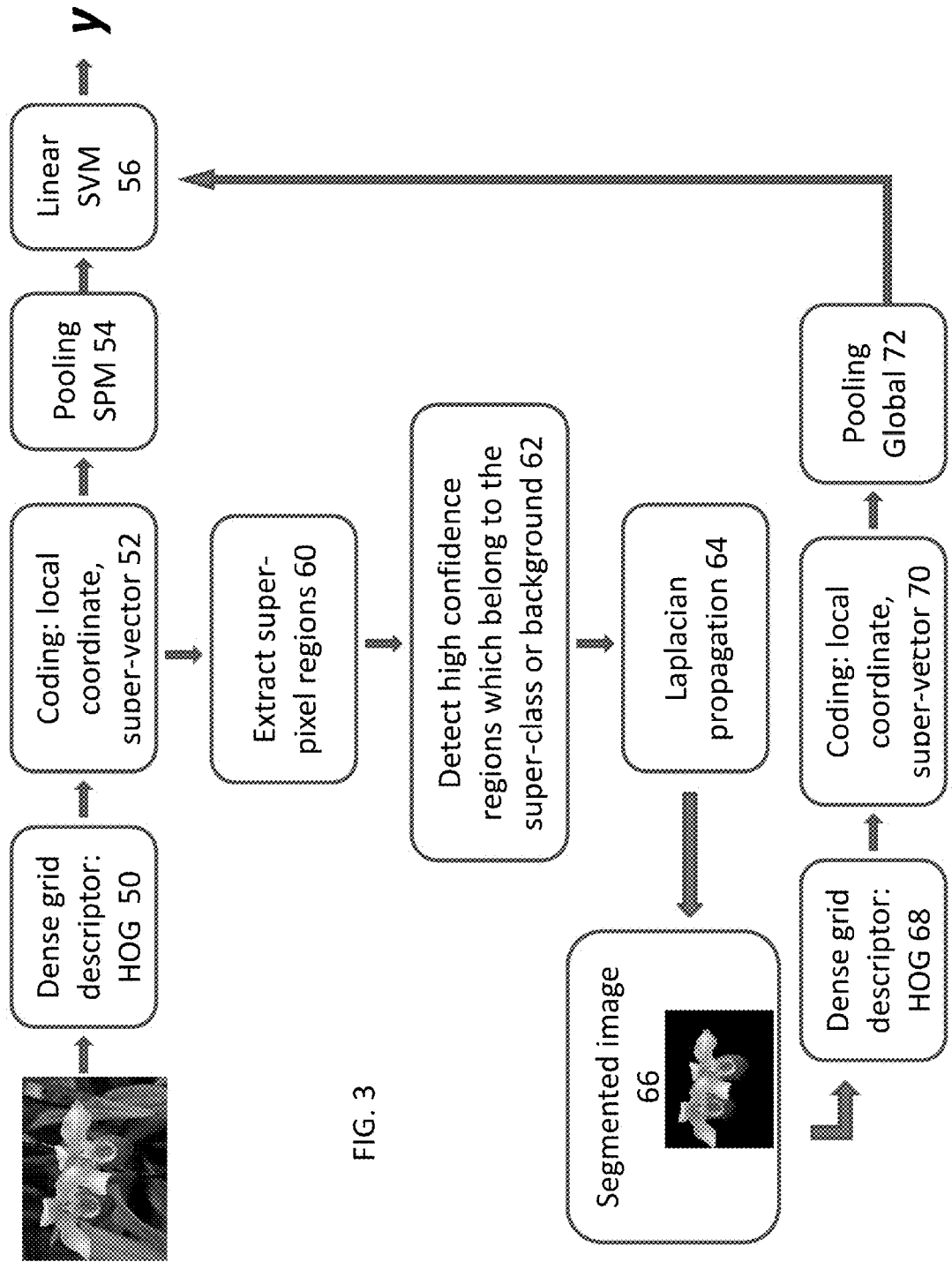
FIG. 3 details an exemplary image segmentation process for large-scale fine-grained recognition.

Turning now to FIG. 2, a framework for combining both input and segmented image is shown. Prior work uses either the input image, or prior works which do segmentation, use the segmented image only. The framework improves fine-grained classification by segmentation at time of detection (10). The framework segments the full-object from initial seed super-pixels (12). A unified framework is generated for combining segmented and original image features for classification (14).

The segmentation is done by using Laplacian propagation applied to the foreground and background region. Prior work uses iterative segmentation methods which are slower. The framework combines segmented and original image features) is a major feature that enables better performance. The process combines the features from both input and segmented image and this is beneficial when the background context is useful or when the segmentation is imperfect. The process is faster than prior work. The process uses the Laplacian propagation and reuses the already computed features in the pipeline from the original image.

The system can identify the object region and segment out the object, so as to discount the background during classification. It will obviously be of huge benefit if the object can be automatically segmented before being recognized, because the recognition system can focus on the relevant regions of the image. When given an image, a person has no problem segmenting the object of interest, so it is almost understood that when an expert classifies the image, their attention will be focused on the most informative foreground area. The process can automatically locate and delineate the contours of the object from the background.

FIG. 3 details an exemplary image segmentation process for large-scale fine-grained recognition. As shown in FIG. 3, the system creates a segmented image and combines both the segmented image and the original image. The process first segments possible object (or objects) that belongs to a top level category. For fine-grained classification, the general top-level category, although very broad, is known so here the process learns a model that can detect regions of possible object in an image. Super-pixel segmentation (Felzenszwalb and Huttenlocher) is used for obtaining initial regions. The initial regions are classified by a region model which is trained on the super-class vs the background. High confidence regions are extracted for both background and object. A Laplacian segmentation is used to extract the full segmented region from initial uncertain (and not always initialized) regions. Next the process utilizes the image with the segmented object (segmented image) in the recognition pipeline to improve the recognition performance. The process combines both the original image and the segmented image before doing the final classification.

In FIG. 3, the original image is processed through a standard feature extraction pipeline. Then, the original image is segmented (some of the features computed from this pipeline are utilized in segmenting the image as well). After that, the segmented image is processed by a similar feature extraction pipeline. Here an example is shown with global pooling, but other poolings are possible. Both features are combined in the final classification.

The segmentation method uses Laplacian propagation on superpixels. Here the process performs normalization so that propagation done on background regions and foreground regions is combined in a principled way and takes advantage of their complementary characteristics. The process also assigns all pixels within a superpixel with their confidence values (when known) unlike using a single pixel (as is done in other Laplacian methods). This improves classification performance. Furthermore, the process uses the same features already computed from the original image which saves time needed to re-compute the features. Previous methods use SIFT based features.

The method starts with an initial search for regions possibly belonging to a flower in the image. For simplicity we use the super-pixel segmentation method by Felzenszwalb and Huttenlocher to over-segment the image into small coherent regions. Each super-pixel region is described by the following set of feature descriptors: average color (R, G, B) of all the pixels within the region, global pooling of all HOG features in the region, after encoding them by the LLC method, shape mask of the region obtained by normalizing the region's area bounding box to 6×6 pixels, and size and boundary features.

Some of the feature descriptors are inspired by other segmentation methods which used super-pixel descriptors: e.g. the use of shape masks and bit-maps denoting adjacency to the boundary of the region. Unlike previous methods, we use the encoded HOG features here, because we believe they have better generalization capabilities and because in the classification method these features are already precomputed in the image and can be reused.

Using the feature representation described above, we build a model which can discriminate if a region belongs to a flower or to the background. We apply this model to each region and extract the high confidence regions for both background and foreground. FIG. 1 shows example high confidence regions selected. We then perform the optimization, described in Section 3.2, to segment the image into foreground area and background area.

Next, the Segmentation process is described. Here we describe the optimization done using the Laplacian operator for the purposes of segmentation. Let $I_j$ denote the j-th pixel in an image and $f_j$ denotes its feature representation. The goal of the segmentation task is to find the label $X_j$ for each pixel $I_j$, where $X_j=1$ when the pixel belongs to the object and $X_j=0$, otherwise. For the optimization, we relax the requirement on $X_j$ and allow them to be real-valued. We form the affinity matrix W, using the feature representations $f_i$ of each pixel:

$$W_{ij} = \exp\left(-\frac{|f_i - f_j|^2}{2\sigma^2}\right) \quad (1)$$

The terms $W_{ij}$ are nonzero for only neighbouring pixels, e.g. in the case we use the 8-connected component neighborhood for each pixel. Additionally, we set $W_{ii}=0$.

The goal is to minimize the cost function C(X) with respect to all pixel labels X:

$$C(X) = \frac{1}{2}\sum_{i,j=1}^{N} W_{ij}\left|\frac{X_i}{\sqrt{D_{ii}}} - \frac{X_j}{\sqrt{D_{jj}}}\right|^2 + \sum_{i=1}^{N}\frac{\lambda}{2}|X_i - Y_i|^2 \quad (2)$$

where $D_{ii}=\sum_{j=1}^{N} W_{ij}$, and $Y_i$ are the desired labels for some (or all) the pixels. Those label constraints impose prior knowledge of what is an object and background (Section 3.1 described the approach of how we assign them).

This is a Laplacian label propagation formulation, and the equation above is often written in an equivalent and more convenient form:

$$C(X) = \frac{1}{2}X^T(I-S)X + \frac{\lambda}{2}|X-Y|^2 \quad (3)$$

where S is set to $S=D^{-1/2}WD^{-1/2}$.

The optimization problem in Equation 2 can be solved iteratively or can be solved as a linear system of equations, which is the selected approach.

After differentiation of Equation 3 an optimal solution for X, can be solved as a system of linear equations:

$$((1+\lambda)I-S)X=\lambda Y \quad (4)$$

$$X=\lambda(1+\lambda)I-S)^{-1}Y. \quad (5)$$

In the implementation we use the Conjugate Gradient method, with preconditioning, and achieve very fast convergence (less than 0.5 seconds).

FIG. 1 visualizes the segmentation process. The top right image shows the confidence of each super-pixel region (here we use the classification margin). The bottom right image shows the solution of the Laplacian propagation, given the initial regions (i.e. the solution to Equation 5). Note that not all of the flower regions have high confidence initially. This is also true for the background regions. After the Laplacian propagation, a stronger separation between foreground and background is obtained. FIG. 3.2.2 shows example segmented images.

To perform the Laplacian segmentation, a feature representation $f_i$ per each pixel is needed. Obviously, the goal is for similar pixels (or pixel neighbourhoods) to have to have very close feature representations, but at the same time the time of computation of these features has to be very fast. Here we set $f_i$ to be the (R, G, B) color values of the pixel, but other choices are possible too.

To make the optimization feasible, we resized the original image to approximately 120×120 pixels per image area (which is typically a 4 to 5 times rescaling, preserving the original aspect ratio). This is needed in order to have a tractable optimization procedure. We did not observe significant improvements in performance when using the full-scale segmentations.

We also note here that the initial super-pixel segmentation of Felzenszwalb and Huttenlocher is not sufficient to do the segmentation for the purposes well. This is because some of the super-pixel regions may not be very informative or their boundaries may not be as smooth as desired for the purposes.

Another thing that is notably different in this work from a standard Laplacian propagation implementation is that, instead of using isolated foreground and background pixels, we use all the pixels in a region, that is detected as confident, and set their initial values to the confidence value of the region. The reason is that the regions may vary in size and texture and may have very different diffusion properties, so in the case we observed better convergence and subsequently better segmentations. This made a big difference in the experiments and resulted in having segmentations that are more stable and adaptive to variabilities in both foreground and background appearances.

The model is then trained which discriminates between a region belonging to the super-class (i.e. any flower) and to the background. Each training image is decomposed into super-pixels using the method proposed by Felzenszwalb and Huttenlocher. Each super-pixel region is described by the set of feature descriptors, already described above.

Given ground truth segmentation, we consider regions with a specific overlap to the background or the foreground. Regions which are in-between are ignored. We then trained a standard linear SVM algorithm to learn the decision boundary. When no ground truth is available, we use approximate segmentation given by an automatic algorithm and then iteratively improve the segmentation by applying the trained model. For example, for the case of Oxford 102 flowers datasets we used the segmentation images provided here and iteratively improved the segmentation. The training of the model is done offline. A potential advantage of this model is that it is general, i.e. not specialized to characteristics of one super-class, and can be applicable to different types of species, whereas previous subcategory classification approaches are more specific.

As mentioned, the input image will be segmented at recognition time. The segmented image is then used in the final flower recognition task. For simplicity, the baseline process is detailed next. We apply a feature extraction and classification pipeline which is very similar to the one of Lin et al. to the input image. In the feature extraction pipeline we first extract HOG features at 4 different levels, then those features are encoded in 8K dimensional global feature dictionary using the LLC method. After that, a global max pooling of the encoded features in the image is done, as well as, max poolings in a 3×3 grid of the image. the classification pipeline uses the 1-vs-all strategy of linear SVM classification and we used the Liblinear SVM implementation. For the very large 578-flowers dataset, we used a Stochastic Gradient Descent algorithm.

The segmented image is processed through the same feature extraction pipeline as the original image. We then combine the two sets of extracted features (from the original image and from the segmented image). One thing to note here is that, because of the decision to apply HOG type features and pooling to the segmented image, the segmentation helps with both providing shape of the contour of the flower to be recognized, as well as, ignoring features in the background that can be distractors. On the other hand, by keeping both sets of features from the original and the segmented image, we can avoid losing precision due to occasional mis-segmentation.

In the experiments we found that it is sufficient to keep a global pooling of the segmented image and this has shown to be very useful for improving performance without increasing the dimensionality too much.

In another embodiment with the region detection and segmentation algorithm, input image and the initial regions which are classified with high confidence to belong to either a flower or the background. Label propagation is done on the image and the final segmentation result.

Since the diffusion properties of the foreground and background of different images (and datasets) may vary, we consider separate segmentations for the detected foreground only-areas and background-only areas, respectively. This is done since the segmentation with respect to one of them could be good but not with respect to the other and combining the results of foreground and background segmentations produces more coherent segmentation and takes advantage of their complementary functions.

$$X_{fg}=\alpha(I-S)^{-1}Y_{fg}, X_{bg}=\alpha(I-S)^{-1}Y_{bg},$$

The two segmentations can be done simultaneously by normalizing the labels as:

$$X_{segm} = \alpha(I-S)^{-1}\left(\frac{Y_{fg}}{\|Y_{fg}\|} - \frac{Y_{bg}}{\|Y_{bg}\|}\right).$$

This makes the process fast since it avoids separate optimizations while providing individual foreground and background segmentations.

In another embodiment, the segmented image is processed through the same feature extraction pipeline as the original image. We then combine the two sets of extracted features. In applying HOG type features and pooling to the segmented image, the segmentation helps with both providing shape of the contour of the object to be recognized, as well as, ignoring features in the background that can be distractors. On the other hand, by keeping both sets of features from the original and the segmented image, we can avoid losing precision due to missegmentation.

In our experiments we found that it is sufficient to keep a global pooling of the segmented image, in addition to the full set of poolings for the original image. This has shown to be very useful for improving performance without increasing the dimensionality too much. We cropped the image to the segmented region (+20 pixels margin), so as to account for scale variability. The latter is very beneficial since these datasets have variabilities in scale and one of the purposes of our segmentation is to be able to localize the object and normalize for its scale. No cropping is done for the two flower datasets, since there the flowers are assumed to take most of the image area (even for small 'cluster' flowers).

The above segmentation technique is robust and adaptive to variety of object appearances and backgrounds. The process uses learning to guide the segmentation process and is based on the intuition that recognizing (even imperfectly) some regions of the object can help delineate its boundaries and thus segment the potential object of interest. The segmentation of objects is very useful for recognition by improving the classification performance on the Oxford 102 flowers dataset and on a large-scale 578 flowers dataset. The improvements in performance are about 4% for both datasets and are due to the automatic segmentation done at test time. This is important since the large-scale datasets contain hundreds of thousands of images and no manual segmentation for them is practical. The algorithm also improves all other known benchmark results on the Oxford 102 flower dataset.

The instant system is simpler and faster than previously used segmentation algorithms in similar scenarios. It is also more general and not specific to the appearance of flowers, so it can potentially be applied to other types of categories in natural images.

Although the speed is at least 5 times better than previous known segmentation algorithms, to improve speed, the feature model can be represented as a mixture of submodels, each one responsible for a subset of flowers that are very similar to each other but different as a group from the rest. This can improve the precision of the model, and subsequently the segmentation, as well. Additionally, the feature representations used can be further enhanced with more powerful and discriminative features.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for fine-grained image classification on an image, comprising:
   automatically segmenting one or more objects of interest prior to classification;
   combining segmented and original image features before performing final classification;
   determining an affinity matrix W, using a feature representations $f_i$ of each pixel:

$$W_{ij} = \exp\left(-\frac{|f_i - f_j|^2}{2\sigma^2}\right);$$

minimizing a cost function C(X) with respect to all pixel labels X:

$$C(X) = \frac{1}{2}\sum_{i,j=1}^{N} W_{ij}\left|\frac{X_i}{\sqrt{D_{ii}}} - \frac{X_j}{\sqrt{D_{jj}}}\right|^2 + \sum_{i=1}^{N}\frac{\lambda}{2}|X_i - Y_i|^2$$

where $D_{ii} = \Sigma_{j=1}^{N} W_{ij}$, and $Y_i$ are the desired labels for pixels; and
   solving an optimal solution for X as a system of linear equations:

$$((1+\lambda)I - S)X = \lambda Y$$

$$X = \lambda((1+\lambda)I - S)^{-1}Y.$$

2. The method of claim 1, comprising obtaining initial regions with super-pixel segmentation.

3. The method of claim 1, comprising classifying initial regions by a region model trained on the super-class as the background.

4. The method of claim 3, comprising applying Felzenszwalb and Huttenlocher segmentation.

5. The method of claim 1, comprising learning a model to detect one or more regions of object(s) in the image.

6. The method of claim 1, wherein the segmentation uses Laplacian propagation applied to a foreground region and a background region.

7. The method of claim 3, comprising reusing previously computed features in a pipeline from the image.

8. The method of claim 1, comprising extracting high confidence regions for background and the object.

9. A method for fine-grained image classification on an original image, comprising:
  automatically segmenting one or more objects of interest prior to classification by:
    extracting super pixel regions from the image;
    detecting high confidence regions belonging to a super-class or a background;
    applying Laplacian propagation to generate a segmented image;
    applying a dense grid descriptor to a Histogram of Oriented Gradients (HOG);
    determining a local coordinate super-vector for the segmented image;
    applying pooling to the segmented image;
    combining segmented and original image features before performing final classification;
    determining an affinity matrix W, using a feature representations $f_i$ of each pixel:

$$W_{ij} = \exp\left(-\frac{|f_i - f_j|^2}{2\sigma^2}\right);$$

minimizing a cost function C(X) with respect to all pixel labels X:

$$C(X) = \frac{1}{2}\sum_{i,j=1}^{N} W_{ij}\left|\frac{X_i}{\sqrt{D_{ii}}} - \frac{X_j}{\sqrt{D_{jj}}}\right|^2 + \sum_{i=1}^{N}\frac{\lambda}{2}|X_i - Y_i|^2$$

where $D_{ii} = \Sigma_{j=}^{N} W_{ij}$, and $Y_i$ are the desired labels for pixels; and
  solving an optimal solution for X as a system of linear equations:

$$((1+\lambda)I-S)X = \lambda Y$$

$$X = \lambda((1+\lambda)I-S)^{-1} Y.$$

10. The method of claim 9, comprising classifying using a linear support vector machine (SVM).

11. The method of claim 9, comprising learning a model to detect one or more regions of object(s) in the image.

12. The method of claim 9, wherein the segmentation uses Laplacian propagation applied to a foreground region and a background region.

13. A system for fine-grained image classification on an image, comprising:
  a camera; and
  a processor coupled to the camera,
  the processor comprising:
  executing code for automatically segmenting one or more objects of interest prior to classification; and code for combining segmented and original image features before performing final classification;
    determining an affinity matrix W, using a feature representations $f_i$ of each pixel:

$$W_{ij} = \exp\left(-\frac{|f_i - f_j|^2}{2\sigma^2}\right);$$

minimizing a cost function C(X) with respect to all pixel labels X:

$$C(X) = \frac{1}{2}\sum_{i,j=1}^{N} W_{ij}\left|\frac{X_i}{\sqrt{D_{ii}}} - \frac{X_j}{\sqrt{D_{jj}}}\right|^2 + \sum_{i=1}^{N}\frac{\lambda}{2}|X_i - Y_i|^2$$

where $D_{ii} = \Sigma_{j=}^{N} W_{ij}$, and $Y_i$ are the desired labels for pixels; and
  solving an optimal solution for X as a system of linear equations:

$$((1+\lambda)I-S)X = \lambda Y$$

$$X = \lambda((1+\lambda)I-S)^{-1} Y.$$

14. The system of claim 13, comprising code for obtaining initial regions with super-pixel segmentation.

15. The system of claim 13, comprising code for classifying initial regions by a region model trained on the super-class as the background.

16. The system of claim 13, comprising code for learning a model to detect one or more regions of object(s) in the image.

17. The system of claim 13, wherein the segmentation uses Laplacian propagation applied to a foreground region and a background region.

18. The system of claim 13, comprising code for cropping the image for the segmented region within a predetermined margin to account for scale variability.

* * * * *